United States Patent [19]

Laakmann

[11] Patent Number: 4,837,772
[45] Date of Patent: Jun. 6, 1989

[54] ELECTRICALLY SELF-OSCILLATING, RF-EXCITED GAS LASER

[75] Inventor: Peter Laakmann, Seattle, Wash.

[73] Assignee: Synrad, Inc., Bothell, Wash.

[21] Appl. No.: 85,889

[22] Filed: Aug. 14, 1987

[51] Int. Cl.$^4$ ............................................. H01S 3/097
[52] U.S. Cl. ........................................ 372/82; 372/38
[58] Field of Search ...................... 372/38, 81, 82, 83

[56] References Cited

U.S. PATENT DOCUMENTS

| | | | |
|---|---|---|---|
| 4,169,251 | 9/1979 | Laakmann | 372/82 |
| 4,363,126 | 12/1982 | Chenausky et al. | 372/38 |
| 4,373,202 | 2/1983 | Laakmann et al. | 372/83 |
| 4,493,087 | 1/1985 | Laakmann et al. | 372/82 |
| 4,635,267 | 1/1987 | Cirkel et al. | 372/38 |
| 4,730,333 | 3/1988 | Butenuth | 372/38 |

Primary Examiner—William L. Sikes
Assistant Examiner—B. Randolph Holloway
Attorney, Agent, or Firm—Seed and Berry

[57] ABSTRACT

An electrically self-oscillating radio frequency-excited gas laser. The discharge section of the laser resonates at a desired radio frequency as a result of incorporating the discharge section into the feedback loop of a power oscillator circuit. This laser structure facilitates initial plasma breakdown and adapts its frequency depending upon whether the gas in the discharge section has broken down. When the laser plasma tube is integrated with the oscillator, the laser is also somewhat smaller compared to gas lasers having conventional crystal-controlled amplifier chains.

24 Claims, 2 Drawing Sheets

ELECTRICALLY SELF-OSCILLATING, RF-EXCITED GAS LASER

TECHNICAL FIELD

This invention relates generally to lasers, and more specifically, to electrically self-oscillating gas lasers.

BACKGROUND ART

Radio frequency (RF)-excited waveguide (and non-waveguide) lasers have found a large number of applications in the past several years because of their compact size, reliability, and ease of manufacture. The basic RF-excited waveguide laser was disclosed in U.S. Pat. No. 4,169,251 by Katherine D. Laakmann. Many other patents exist that cover various other laser structures having plasma tube discharge sections that are electrically excited by radio frequency voltages between a pair of electrodes. All of these lasers have in common a resonating or traveling wave discharge structure using inductors to neutralize the capacitive reactance of the discharge electrodes.

The drive impedance created by this matching technique is essentially real (ohmic), in order to realize an impedance match to an independent source of RF energy. These excitation sources are generally crystal-controlled amplifier chains operating on one of the FCC-authorized ISM frequencies at 13, 27 and 40 MHz. With extreme shielding, operation on non-ISM frequencies between 30 and 200 MHz is also feasible and practiced by some companies.

This known method of independent laser excitation (or pumping) has been worked out quite well and it has been quite satisfactory for prior art devices. However, with the disclosure by Peter Laakmann of an all metal gas laser structure in a pending U.S. patent application Ser. No. 857,354, now abandoned, these amplifier chains become a very significant or even the dominant part of the total laser cost. It is therefore desirable to excite the plasma tube of a gas laser by means of oscillator circuitry that can cause the laser to be electrically self-oscillating and can require fewer components.

An additional problem with the prior art is that the laser shows two impedance levels that have to be matched to the amplifier: the high-impedance operating state prior to breakdown of the plasma and the low-impedance state after breakdown. This means that the amplifier must be a compromise that will provide operation in both modes.

It is also therefore desirable to have an RF-excited gas laser that incorporates an oscillator circuit that automatically adjusts to the changeable parameters of the lasing gas medium.

DISCLOSURE OF THE INVENTION

It is a primary object of the invention to provide a simpler, more efficient, less costly, and smaller drive source for RF excitation.

It is an additional object of the invention to provide automatic adjustment of laser parameters to provide automatic adjustment of laser parameters to facilitate breakdown of the lasing gas and steady-state laser operation by a self-oscillating feature.

It is a further object of the invention to make the laser tube and oscillator circuit an integral assembly in order to freely choose the optimal operating frequency.

It is still another object of the invention to integrate the oscillator circuit with a switching regulator in order to achieve line voltage-to-chassis isolation.

In general, the RF-excited gas laser of the present invention comprises a plasma tube including a discharge section having a pair of electrode means made from electrically conductive materials and forming an electrically resonant circuit, a lasing gas medium within the discharge section, and an oscillator circuit for causing electrical oscillations between the pair of electrode means at a desired operating radio frequency, the oscillator circuit incorporating said discharge section in an electrical feedback path.

The aforementioned objects and advantages thereof will be more fully understood hereinafter as a result of the detailed description of the preferred embodiments of the invention when taken in conjunction with the drawings as described below.

BEST MODE FOR CARRYING OUT THE INVENTION

In the present invention, the laser structure is resonated to the desired operating frequency by coils either inside or outside the plasma tube that is a part of the laser. These coils can be arranged to form a parallel resonant circuit having an impedance extreme at resonance. If the coils are arranged to form a parallel resonant circuit, the impedance is a maximum at resonance. If they form a series resonant circuit, the impedance is a minimum at resonance. Regardless of its form, the resonant circuit is then electrically connected to a feedback loop of an amplifying device that is part of the oscillator. In a typical implementation, the resonant circuit is used as a shunt element, forcing the highest loop gain of the oscillator to occur at resonance.

The nature of oscillators is such that they always operate at the point of maximum gain, and any excess gain (greater than 1) is prevented when the amplifier saturates. This is true of all oscillators, including the discharge section of a gas laser oscillator that is being excited by a driving oscillator. In this "double oscillator" configuration, the exciting oscillator will first seek the frequency of highest gain. This occurs, of course, at the frequency where the resonant circuit of the discharge section of the laser has its maximum impedance. The oscillator will therefore initially operate at the frequency that generates the maximum voltage across the discharge section. This is precisely the condition required to facilitate initial breakdown. After the plasma breaks down, the oscillator will readjust its parameters for maximum voltage across the discharge. Any excess gain drives the amplifier into saturation, until the gain is one. This forces the oscillator operation to the point of highest efficiency.

This self-excited "double oscillator" maximizes the voltage that generates laser ignition. After breakdown has occurred, it also generates laser output at the optimum electrical and optical parameters. However, the interaction between breakdown excitation and laser optical oscillation is very slight, so that the problem can be analyzed by viewing the plasma excitation separately from the optical oscillation (which is normally self-oscillating in a laser).

Figure 1:
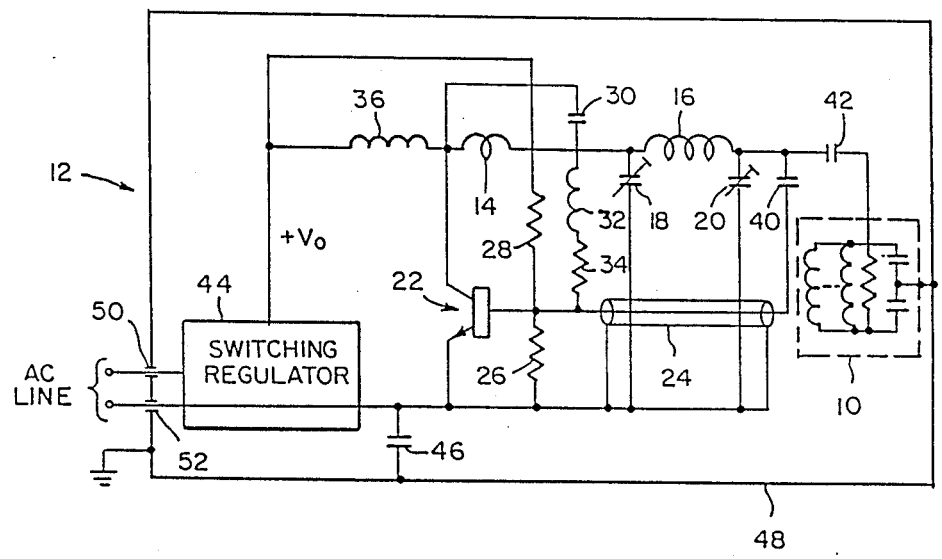
FIG. 1 is a schematic diagram of the arrangement of an oscillator circuit for providing pump power for a parallel resonant gas laser.

Referring specifically to FIG. 1, it will be seen that a discharge section 10 of the gas laser 12 can be represented by a parallel resonant circuit. For other structures, such as that shown in FIG. 2, the discharge section 10 can be represented by a series resonant circuit. The parallel resonant circuit of FIG. 1 is made up of the capacity to ground of each of the two discharge electrodes and one or more shunt inductances placed across the discharge section, as a lumped constant or transmission line structure. A lasing gas mixture, containing, for example, CO or $CO_2$, is contained within the discharge section. A typical power oscillator includes a single transistor and impedance matching networks that place the laser into an electrical feedback loop. While oscillators using several transistors for higher power levels are feasible, an alternate approach is to use several oscillators distributed along the length of an elongated laser (plasma) tube. The latter leads to more even heat distribution along the laser. The configuration shown in FIG. 1 is that of the balanced configuration found in patent application Ser. No. 857,354, now abandoned. An unbalanced configuration, such as that shown in U.S. Pat. No. 4,169,251 and FIG. 2, would be no different as far as operation of the circuit is concerned. The resistor shown in the parallel resonant circuit of discharge section 10 in FIG. 1 represents the real part of the discharge impedance or the circuit losses of the reactances in the "discharge off" condition.

Inductors 14 and 16, in combination with variable capacitors 18 and 20, represent the impedance matching network to couple the typically 150-ohm driving impedance of the laser to the output impedance of transistor 22, which is typically two to five ohms. The cable 24 shown represents a quarter wave impedance transformer made from coaxial cable to transform the base drive impedance of the transistor (typically about one ohm) to about one thousand to two thousand ohms. This splits about one-tenth of the output power back to the base of the transistor in a feedback mode.

Resistors 26 and 28 provide quiescent bias in order to provide the initial gain for the start of oscillations. These can be wire-bound resistances doubling as RF chokes. Capacitor 30, inductor 32, and resistor 34 comprise a damping network. Such a damping network is typically used to prevent parasitic oscillations at low frequencies by providing strong negative feedback. The network has essentially no effect at the operating frequency. Coil 36 is an RF choke at the operating frequency and has no effect other than to apply DC voltage to the transistor 22. For operation near 50 MHz, inductor 14 is a hairpin coil about one-half inch square and coil 16 has about 2 turns and a diameter of one-half inch. Adjustable capacitors 18 and 20 can have values of about 300 pF. Capacitors 40 and 42 are not critical and can have values on the order of about 200 pF.

Upon applying $V_O$ (above twelve to fifty volts DC, depending on the transistor chosen) from a voltage regulator such as switching regulator 44, the transistor 22 will operate in a class A mode and provide a large amount of gain at the resonant frequency of the laser. Oscillations will start in the oscillator circuit and build up until breakdown of the lasing gas occurs within the discharge section. Operation of the transistor is saturated both before and after the start of oscillations, since an excess of gain has been designed into the oscillator circuit by appropriate choice of component values. It facilitates the setup of the circuit to make at least capacitors 18 and 20 variable and to tune for maximum output or efficiency as in any class "C" RF amplifier.

The switching regulator 44 shown serves as an AC to DC power converter and can be of the conventional simple series inductance, step-down type. The regulator input and output are not isolated and the entire RF circuit rides on the line voltage. The capacitors 42 and 46 provide grounding for the RF voltage without causing excessive line current ground leakage because of the high operating frequency. Values of around 1000 to 5000 pF are adequate for capacitor 42. Plasma power input (RF) in excess of 100 W at 50% or more efficiency is easily achieved by the gas laser structure just described.

Enclosure 48 for the gas laser 12 provides RF shielding, with conventional feedthrough filters 50 and 52 providing lead filtering.

Figure 2:
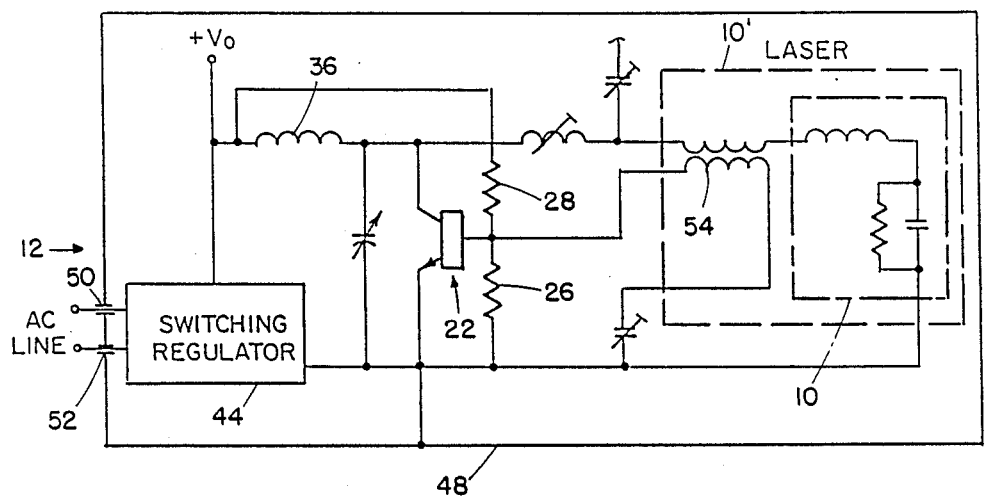
FIG. 2 is a schematic diagram of the arrangement of an oscillator circuit for providing pump power for a series resonant gas laser.

FIG. 2 is a schematic diagram of the arrangement of an oscillator circuit for providing pump power for a series resonant gas laser. Those components serving similar functions to their counterparts in FIG. 1 are given the same reference numerals. The series resonant circuit 10 of FIG. 2 attains a minimum impedance at its resonance frequency and, accordingly, allows the greatest current to flow at resonance. The electrical feedback path, then, must carry a signal representative of the current flow through discharge section 10. This signal passes through 1:1 transformer 54. With the feedback path identified, one skilled in the art will appreciate the electrical characteristics which make the circuit oscillate at the desired frequency. If desired, transformer 54 can be considered to be a part of the discharge section and, therefore, represented by two-port network 10′. Similarly, discharge section 10 of FIG. 1 can be represented as a two-port network by including cable 24 which serves as a transmission line transformer.

Figure 3:
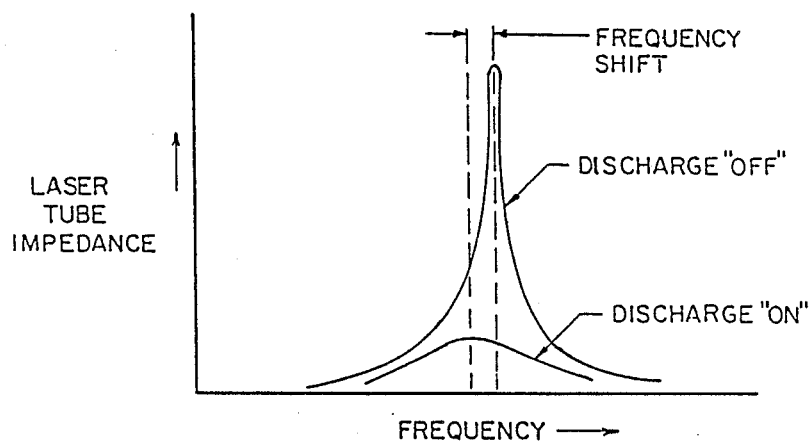
FIG. 3 is a graph showing the impedance variation of a typical gas laser with frequency and discharge state.

FIG. 3 is a graph showing the impedance variation of the above-described gas laser as a function of frequency and discharge state. The magnitude of the impedance is shown, without regard to phase, for simplicity. The shift in resonant frequency between discharge "off" and "on" states is affected by circuit configuration, traveling waves, damping factor, and other factors related to the structure of the gas laser 12. Oscillation frequency in both states is generally very close to the frequencies producing the respective peak impedances, due to the rapid phase change in the total circuit for only slight changes in frequency. Typically, the Q factor of the laser tube is about 200 before breakdown and about 10 to 20 after breakdown. The frequency shift between discharge "off" and "on" states can be downward (as shown), or upward, depending upon the laser structure. In any case, the frequency shift is generally at most a few percent of the operating frequency.

It is convenient to mount the oscillator directly to the laser tube, as such oscillators are quite compact (2–4 cubic inches). this also eliminates almost all radiation and allows use of any convenient non-ISM frequency. It has been found that frequencies around 50 MHz are most useful. With an integrated switching regulator, such laser heads can then be directly powered from an AC line voltage. It is possible to use a floating output switching regulator, since the isolation between the line voltage and the chassis can be handled by capacitively coupling the high-frequency laser drive power to the tube. The inefficient or heavy isolation transformer normally used in such regulators is therefore not required.

Those having skill in the art to which the present invention pertains will now, as a result of the applicant's teaching herein, perceive various modifications and additions. By way of example, other oscillator circuits can be used which are even less frequency selective by eliminating the quarter wave transformer or using transistors in a push-pull configuration to gain additional power or bandwidth. Additionally, the circuit can be altered for laser devices using series resonant excitation, having an impedance minimum at resonance, or the laser discharge section can be configured as a two-port network containing transmission line structures and placed into the feedback loop as such. Alternately, the oscillator circuit bias may be made switchable rather than fixed to eliminate the bias network power drain. However, all such modifications and additions are deemed to be within the scope of the invention, which is to be limited only by the claims appended hereto.

I claim:

1. A radio frequency-excited gas laser, comprising:
a plasma tube for producing laser energy, said plasma tube including a discharge section, an optical resonator, and means for outcoupling laser energy from the laser, said discharge section having electrodes made from electrically conductive material, said electrodes having electrical capacities;
a laser gas medium within said discharge section;
an amplifier having an input and an output, the output being connected to the plasma tube and the input being connected to the plasma tube, for amplifying energy from the plasma tube, and thereby forming a feedback path; and
an inductive element connected to said electrodes, said inductive element forming a resonant circuit with said electrical capacity, said resonant circuit being resonant at a predetermined operating radio frequency.

2. The radio frequency-excited gas laser of claim 1 wherein said electrical feedback path includes a transformer.

3. The radio frequency-excited gas laser of claim 1 wherein said feedback path includes a transformer.

4. The radio frequency-excited gas laser of claim 1 wherein said discharge section is a series-connected resonant circuit that has a minimum impedance at said radio frequency.

5. The radio frequency-excited gas laser of claim 1 wherein said discharge section includes a two-port network having separate input and output connections.

6. The radio frequency-excited gas laser of claim 5 wherein said two-port network is an impedance-matching network for matching said impedance of said input and output connections.

7. The radio frequency-excited gas laser of claim 5 wherein said two-port network further includes a transformer made from a transmission line, the transformer being connected between the input and output connections of the two-port network.

8. The radio frequency-excited gas laser of claim 1 wherein said oscillator is powered by a non-isolating AC to DC power converter.

9. The radio frequency-excited gas laser of claim 1 wherein said discharge section is connected to an electrical ground and said amplifier is connected capacitively to said plasma tube.

10. The radio frequency-excited gas laser of claim 1 wherein said laser gas medium includes $CO_2$.

11. The radio frequency-excited gas laser of claim 1 wherein said laser gas medium includes CO.

12. A radio frequency-excited gas laser, comprising:
an elongated plasma tube for producing laser energy, said plasma tube including a discharge section, an optical resonator, and means for outcoupling laser energy from the laser, said discharge section having a pair of electrodes each extending along a portion of the length of the plasma tube and being made from electrically conductive material, said electrodes having electrical capacities;
a laser gas medium within said discharge section;
an amplifier having an input and an output, the output being connected to the plasma tube and the input being connected to the plasma tube, for amplifying energy from the plasma tube, and thereby forming a feedback path; and
a plurality of inductive shunt means distributed along the length of said elongated plasma tube and connected to said pair of electrodes to form a resonant circuit with the electrical capacities thereof, said resonant circuit being resonant at a predetermined operating radio frequency.

13. The radio frequency-excited gas laser of claim 12 wherein said laser gas medium includes $CO_2$.

14. The radio frequency-excited gas laser of claim 13 wherein said laser gas medium includes CO.

15. The radio frequency-excited gas laser of claim 12 wherein said feedback path includes a transformer.

16. The radio frequency-excited gas laser of claim 12 wherein said oscillator is powered by a non-isolating AC to DC power converter.

17. The radio frequency-excited gas laser of claim 16 wherein said discharge section is connected to an electrical ground and said amplifier is connected capacitively to said plasma tube.

18. A radio frequency-excited gas laser, comprising:
an elongated plasma tube for producing laser energy, said plasma tube including a discharge section, an optical resonator, for laser energy outcoupling means, said discharge section having a pair of electrodes each extending along a portion of the length of the plasma tube and made from electrically conductive material, said pair of electrodes having electrical capacities;
a laser gas medium within said discharge section;
an amplifier having an input and an output, the output being connected to the plasma tube and the input being connected to the plasma tube, for amplifying energy from the plasma tube, and thereby forming a feedback path; and
a plurality of inductive shunt means mounted on the length of said elongated plasma tube and connected to said pair of electrodes to form a resonant circuit with the electrical capacities thereof, said resonant circuit being resonant at a predetermined operating radio frequency.

19. The radio frequency-excited gas laser of claim 18 wherein said feedback path includes a transformer.

20. The radio frequency-excited gas laser of claim 18 wherein said laser gas medium includes $CO_2$.

21. The radio frequency-excited gas laser of claim 18 wherein said laser gas medium includes CO.

22. The radio frequency-excited gas lasr of claim 18 wherein said discharge section is a two-port network having separate input and output connections, each connection having an impedance.

23. The radio frequency-excited gas laser of claim 22 wherein said two-port network is an impedance-matching network for matching said impedance of said input and output connections.

24. The radio frequency-excited gas laser of claim 22 wherein said two-port network further includes a transformer made from a transmission line, the transformer being connected between the input and output connections of the two-port network.

* * * * *

UNITED STATES PATENT AND TRADEMARK OFFICE
CERTIFICATE OF CORRECTION

PATENT NO. : 4,837,772
DATED : June 6, 1989
INVENTOR(S) : Peter Laakmann

It is certified that error appears in the above-identified patent and that said Letters Patent is hereby corrected as shown below:

In column 6, claim 18, line 45, please delete "for" and substitute therefor --and--.

In column 7, claim 22, line 1, please delete "lasr" and substitute therefor --laser--.

Signed and Sealed this

Fifteenth Day of September, 1992

Attest:

DOUGLAS B. COMER

*Attesting Officer*   *Acting Commissioner of Patents and Trademarks*